C. E. BROOKS.
STEERING MECHANISM.
APPLICATION FILED MAY 29, 1911.
1,091,423.
Patented Mar. 24, 1914.
2 SHEETS—SHEET 1.
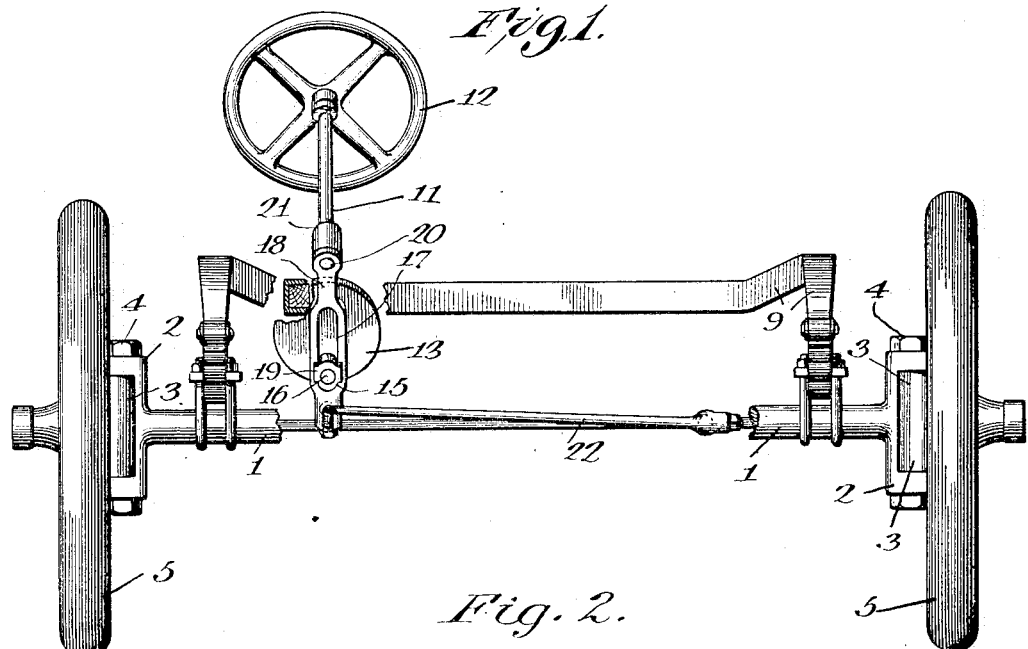
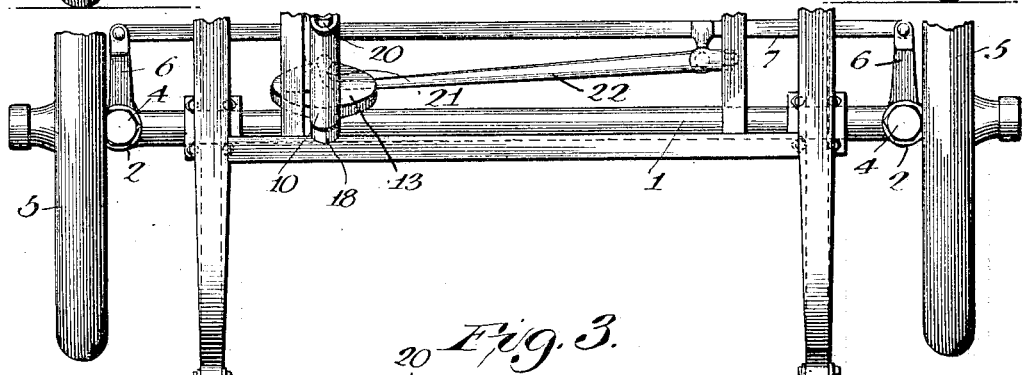
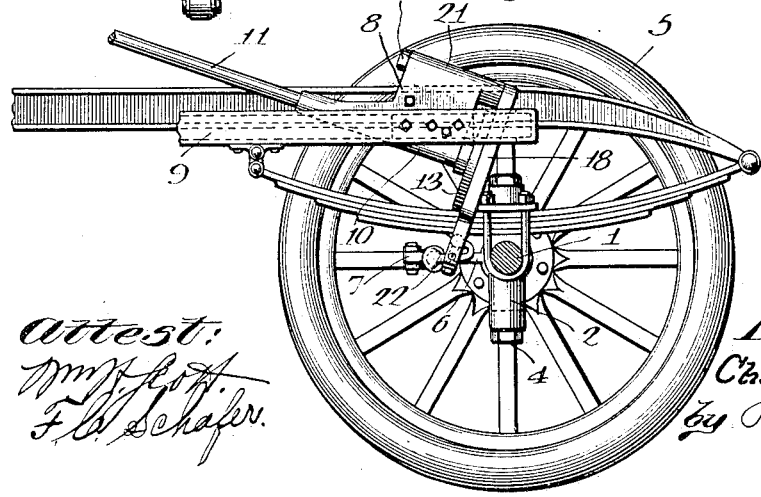
Attest:
Inventor:
Charles E. Brooks C. E. BROOKS.
STEERING MECHANISM.
APPLICATION FILED MAY 29, 1911.
1,091,423.
Patented Mar. 24, 1914.
2 SHEETS—SHEET 2.
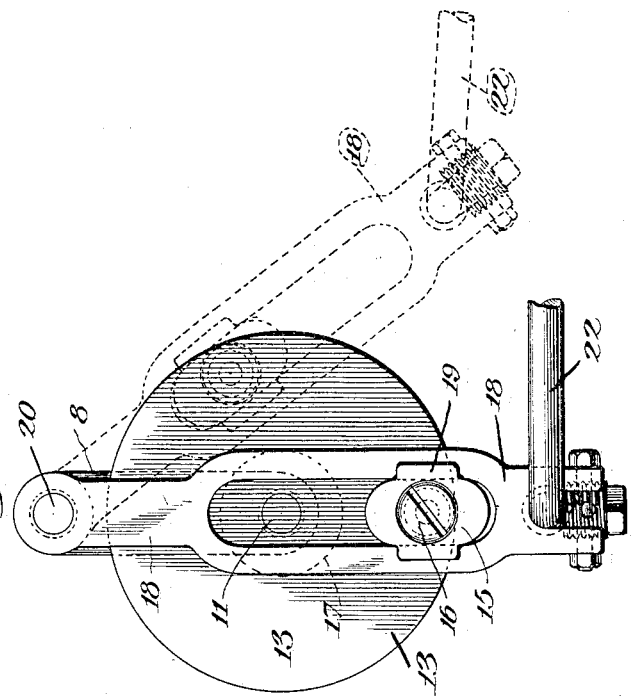
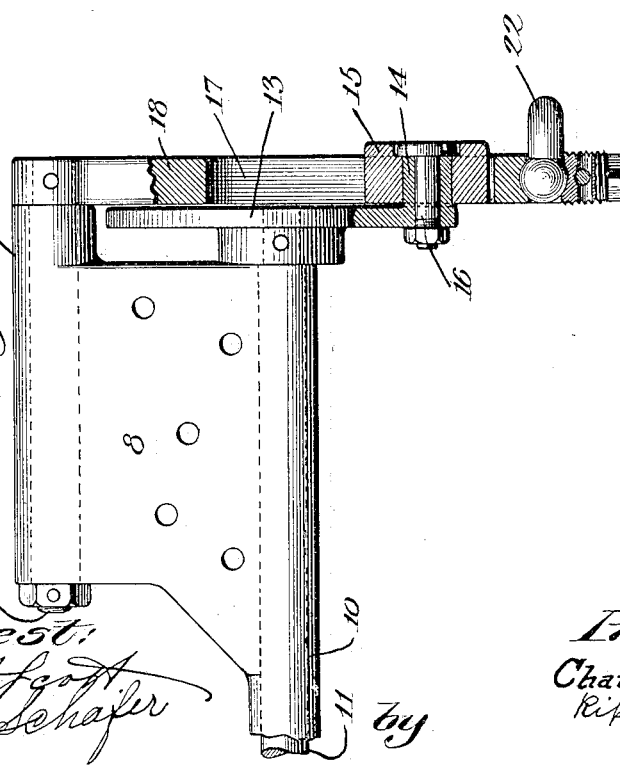
Attest:
Wm J Scott
F C Schafer
Inventor:
Charles E. Brooks
Rippey & Kingsland
Attys.

UNITED STATES PATENT OFFICE.

CHARLES E. BROOKS, OF ST. LOUIS, MISSOURI, ASSIGNOR TO BROOKS-LATTA AUTOMOBILE MANUFACTURING COMPANY, A CORPORATION OF MISSOURI.

STEERING MECHANISM.

1,091,423.   Specification of Letters Patent.   Patented Mar. 24, 1914.

Application filed May 29, 1911.   Serial No. 630,213.

*To all whom it may concern:*

Be it known that I, CHARLES E. BROOKS, a citizen of the United States, residing at the city of St. Louis, State of Missouri, have invented a new and useful Steering Mechanism, of which the following is a specification.

This invention relates to improvements in steering mechanisms, and more particularly to steering mechanisms for motor vehicles.

One of the chief objects of the invention is to provide a simple, economical and durable steering apparatus for motor vehicles, whereby a large balance of leverage will be placed in the hands of the operator, for the ready control of the vehicle with which it may be used, and lost motion will be reduced to a minimum.

My invention consists in the novel arrangement and combination of parts hereinafter shown, described and claimed.

The nature and principle of my invention will be readily understood from the following specification, taken in connection with the accompanying drawings forming a part thereof, and in which—

Figure 1 is a front view, partially in section, showing my novel steering mechanism and its connections. Fig. 2 is a plan view of the same parts. Fig. 3 is a side elevation of a portion of a motor vehicle to which my steering mechanism is applied. Fig. 4 is an enlarged detail view, partially in section, showing the connections from the steering column, and Fig. 5 is a front elevation of the same connections.

I have illustrated my invention applied to a motor vehicle of usual construction, and in order that my invention may be readily understood, I will first briefly describe those parts that are common in such vehicles and with which my improved steering mechanism coöperates in directing the path of the vehicle.

The front axle 1 is rigidly secured transversely of the frame or chassis of the vehicle. The axle 1 carries at each end a fork or yoke 2. An axle member is pivoted by means of a stud bolt 4 to each of said forks or yokes 2, thus constituting a knuckle joint connection therewith. On each of these axle members 3 is revolubly mounted, in the usual manner, a front wheel 5, which is suitably secured thereon so that it may rotate freely. An arm 6 extends rearwardly at right angles to each of the said members 3; said arms being connected by a drag link 7 running transversely across the front of the vehicle between the said arms 6. The parts just described will be recognized as those usual in the construction of motor vehicles of the well known types.

In the construction of my improved mechanism, I employ a bearing casting 8, which is rigidly secured in any suitable manner to the frame or chassis 9. Said member 8 is formed with a bearing portion 10 in which the steering column 11 is journaled; said column 11 being surmounted by a steering wheel 12 of the usual type, whereby said column 11 may be manually rotated. A plate 13 is rigidly secured at its center to the lower end of the said steering column 11. The plate 13 carries eccentrically a boss 14, which constitutes an axle upon which a block 15 is loosely mounted, and retained in proper adjustment by means of a bolt 16. The block 15 extends through a slot 17 in the lever 18. The length of said slot 17 may be varied, thus varying the angle at which the wheels of the vehicle may be turned. Flanges 19 on the outer face of the block 15 constitute guides, or retaining means effective to prevent the lever 18 from becoming displaced in its different operative adjustments. The lever 18 is attached to a supporting shaft 20 mounted in a bearing 21, constituting a part of the casting 9, as clearly shown in Fig. 4. A link 22 has ball and socket connection with the lower end of the lever 18, and with the link 2, thus constituting an operative connection from the lever 18 to the said link 2, whereby force from the lever 18 will be transmitted to the drag link 2.

It will be noted that the present invention avoids the use of the usual gear mechanism, which is expensive in construction, which wears readily, and is more likely to become out of operative adjustment than my arrangement, which is simple in construction and inexpensive to manufacture.

In operation, the steering wheel 12, for example, may be turned to the right, which manipulation rotates the plate 13, in turn causing the lever 18 to swing to the left, to the position shown by dotted lines in Fig. 5. The lever 18 thrusts the link 22 to the left, which link having connection with the drag link 7, causes the said link 7 also to be thrust to the left, thus swinging the arms 6 in like direction, thereby turning the stud axle 3 to the right causing the wheels of the vehicle to change their path of travel in the direction the steering wheel is rotated.

It is apparent that many modifications in the details of construction and arrangement of the parts may be made, which would not be a departure from the spirit and scope of my invention. I do not, therefore, restrict myself to exact details of construction and arrangement herein shown and described, but

What I claim and desire to secure by Letters Patent of the United States is—

1. In an automobile, steering mechanism comprising in combination, a bearing bracket arranged to be secured to the automobile, said bracket being provided with a cylindrical bearing extension adapted to receive a steering column and a second bearing above said first-named bearing, a steering column mounted in said first named bearing extending beyond the front face of said bracket, a disk plate mounted on the extending end of said steering column, a lever provided with a slot extending from above said steering column to a point below the edge of said disk, a shaft for supporting said lever journaled in said second-named bearing formed in said bracket, a support near the edge of said disk plate, and a roller on said support adapted to bear against the edge of said slot and move said lever when the steering column is operated, substantially as specified.

2. In an automobile, steering mechanism comprising in combination, a bearing bracket arranged to be secured to the automobile, said bracket being provided with a cylindrical bearing extension adapted to receive a steering column and a second bearing above said first-named bearing, a steering column mounted in said first named bearing extending beyond the front face of said bracket, a disk plate mounted on the extending end of said steering column, a lever provided with a slot extending from above said steering column to a point below the edge of said disk, a shaft for supporting said lever journaled in said second-named bearing formed in said bracket, a support near the edge of said disk plate, a roller on said support adapted to bear against the edge of said slot and move said lever when the steering column is operated, and flanges on said roller engaging the front surface of said lever and holding said lever in proper adjustment relative to said plate, substantially as specified.

In witness whereof, I have signed this specification in the presence of two subscribing witnesses.

CHARLES E. BROOKS.

Witnesses:
CHARLES LATTA,
B. KRAMER.

---

Copies of this patent may be obtained for five cents each, by addressing the "Commissioner of Patents, Washington, D. C."